Patented Apr. 13, 1937

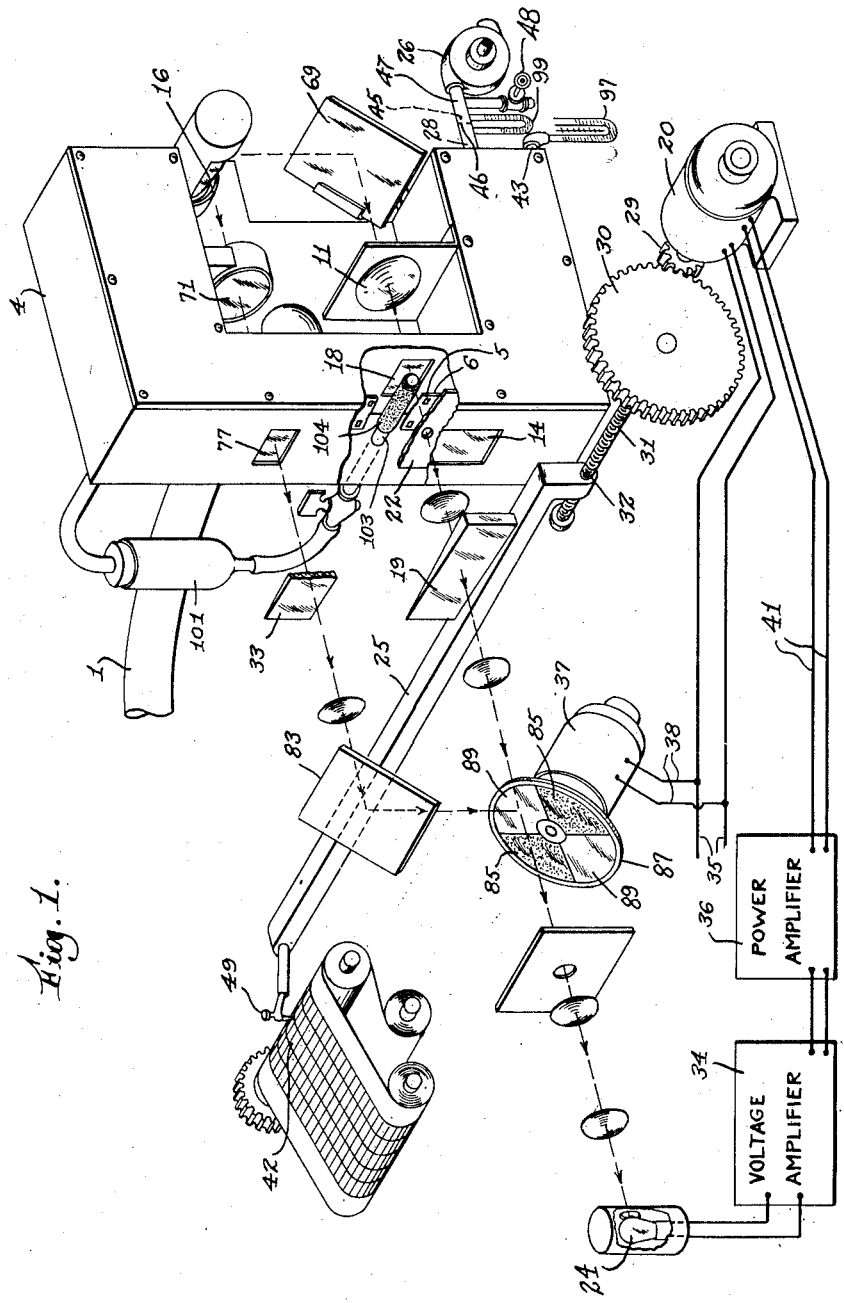

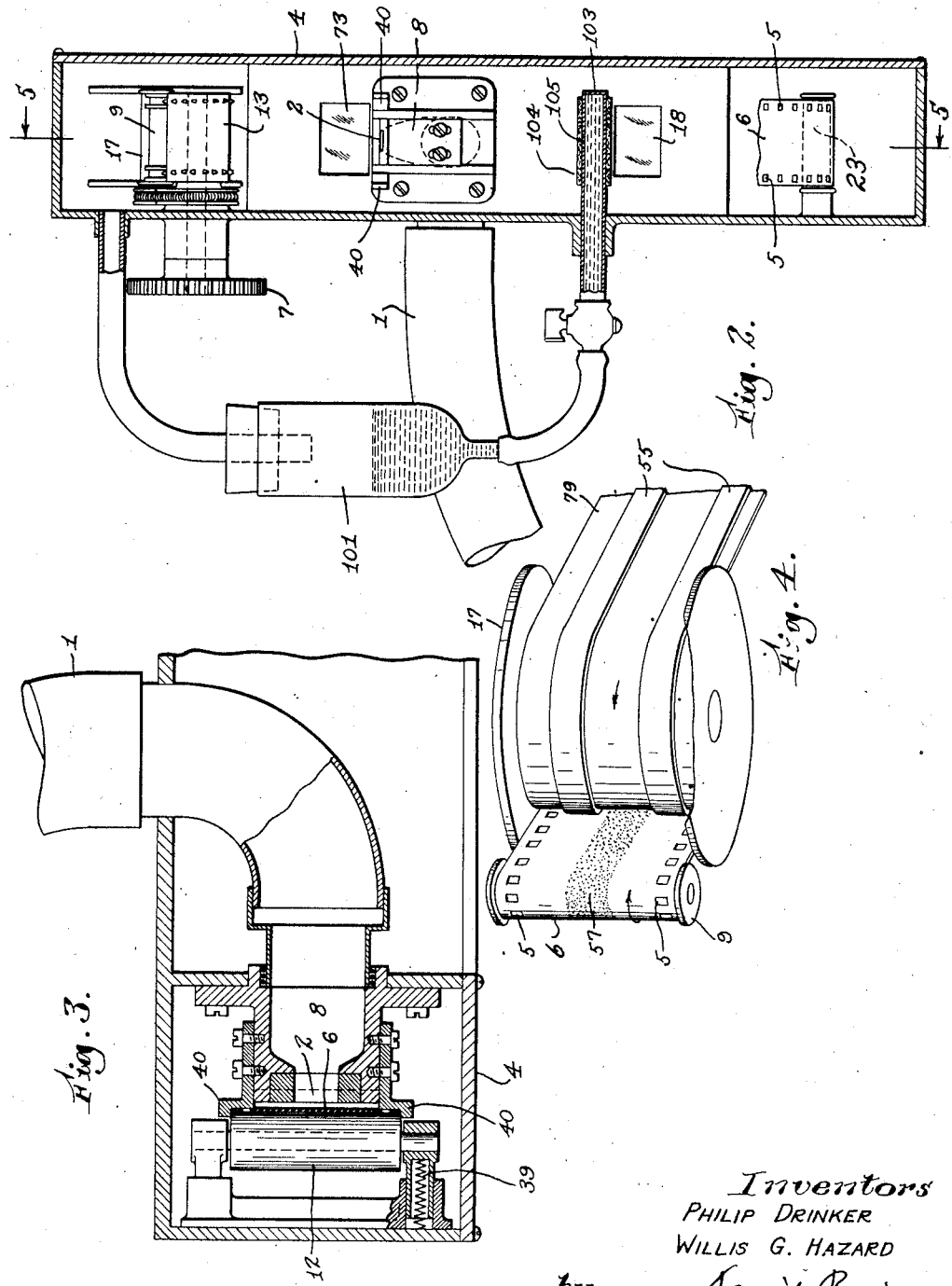

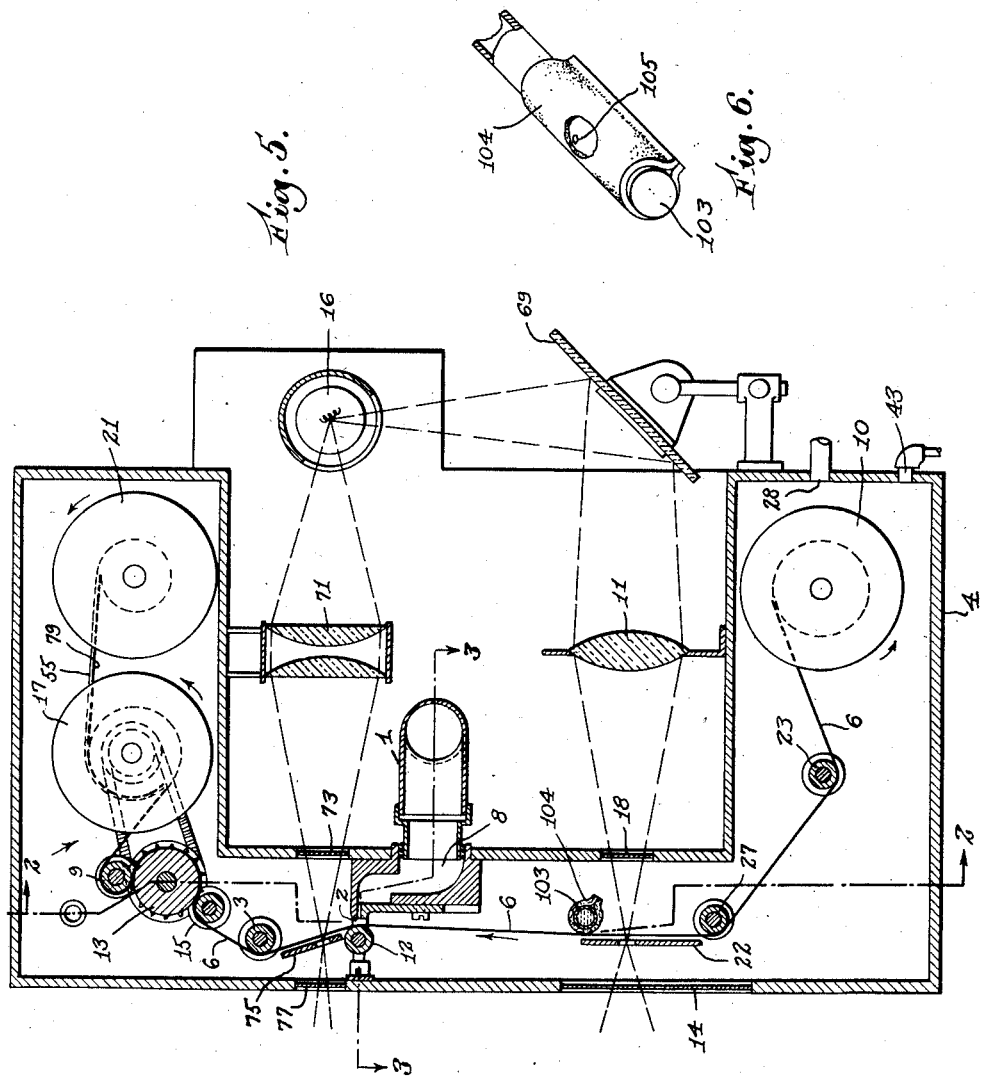

2,076,553

UNITED STATES PATENT OFFICE 2,076,553

APPARATUS FOR MEASURING, RECORDING, AND CONTROLLING DILUTE DUST CONCENTRATIONS

Philip Drinker, Brookline, and Willis Gilpin Hazard, Jamaica Plain, Mass.

Application March 5, 1934, Serial No. 714,004

21 Claims. (Cl. 88—14)

The present invention relates to apparatus for determining, measuring, recording, controlling and the like, the concentration of dilute dust suspended in air and other gases.

An object of the invention is to provide novel apparatus for continuously measuring, recording or controlling dilute dust concentrations suspended in air or other gases.

It is desirable in many cases to determine the dust content of the air of a room, particularly where the dust concentration may furnish a recognized or suspected dust hazard. If the atmosphere of a factory or other industrial establishment, such as a mine, carries more than a certain, safe proportion of silica dust, for example, the workmen exposed to and breathing the air therein may contract silicosis. Such silica dust particles, which may be no more than one twenty-five thousandth of an inch in diameter, are very widely distributed in quarries, subways, foundries and cutlery establishments, and wherever else pulverized quartz or sand is abundant. It is important for the hygienist investigating dust and dust-like impurities as a menace to health, in controlling industrial diseases, to be able to determine and record the dust concentration of the atmosphere. It is further desirable, in other cases, to control industrial processes where mixtures of dust and gases are fundamental to the carrying out of the process; as, for example, in the manufacture of zinc oxide and other pigments.

In a copending application, Serial No. 587,854, filed January 21, 1932, there is disclosed a novel apparatus of the above-described character that is quite efficient for dust particles of very small size; but it is not, in all cases, quite so reliable when relatively very large dust particles are involved.

Another object of the present invention, therefore, is to improve upon the apparatus disclosed in the said application.

A further object is to provide a new and improved apparatus for measuring, recording or controlling the dust concentration of the air or other gas in which it is suspended.

Other and further objects will be explained hereinafter and will be particularly pointed out in the appended claims.

The invention will now be explained in connection with the accompanying drawings, in which Fig. 1 is a diagrammatic, perspective view of apparatus and circuits constructed and arranged according to a preferred embodiment of the present invention; Figs. 2 and 3 are sections of the apparatus shown in Fig. 5, the sections being taken upon the lines 2—2 and 3—3, respectively, looking in the directions of the arrows; Fig. 4 is a fragmentary perspective, looking in the direction of the upper, left-hand arrow in Fig. 5; Fig. 5 is a longitudinal, vertical section taken upon the line 5—5 of Fig. 2, looking in the direction of the arrows; and Fig. 6 is a perspective of a detail.

The gas to be tested, containing the dilute dust concentration, such as dusty air, is assumed to be contained in a room or other space (not shown) that is connected by a dusty-air intake pipe 1, with a chamber 8. A stream of the dust-laden air or other gas is drawn by a suction pump 26 from the chamber 8, at a predetermined station, through a predetermined region or area, shown as a slit-shaped orifice or jet 2, into an air-tight, preferably metal, casing 4, towards a slowly moving strip of a transparent, scratch-free, substance, such as a moving-picture-film base 6. The suction pump 26 may be driven in any desired manner, as by means of a motor (not shown). The path of the dust-laden air is continuously directly toward that portion of the film 6 that is disposed over an idler roll 12, which is disposed opposite to the jet 2; and because the casing 4 is air-tight, dust is prevented from becoming deposited on the film except at the predetermined station. Springs 39, one on each side of the roll 12, press the roll 12 to the right, as viewed in Fig. 3, to maintain the film 6 pressed against guides 40, thus to maintain the film 6 at a uniform distance from the jet 2. The suction pump 26 is connected by a pipe 28 with an opening of the casing 4 through a pipe 47. A mercury manometer 97, that is connected with the casing 4 at 43, measures the negative pressure in the casing 4, and will indicate whether the jet 2 becomes plugged. A manometer 99 is connected across an orifice 45 in a member 46 in the pipe 47 connecting the pipe 28 with the pump 26. A valve 48 (Fig. 1) is inserted between the pump 26 and the manometer 99.

The air flow through the jet 2 is adjusted manually by the valve 48; for, the more the air that flows through the valve 48 to the pump 26 through the pipe 28, the more the air that flows in through the jet 2. The air flow may, however, be automatically controlled by varying the speed of the motor (not shown) that drives the pump 26. In practice, it is desired to have the air flow through the jet 2 constant.

The film 6 may be continuously unwound from a reserve spool 10 by a gear wheel 7, acting upon a driving sprocket wheel 13, the teeth of which engage in the usual, film perforations 5. The gear wheel 7 may be driven from the hereinafter-mentioned motor 37 or from a separate synchronous or other constant-speed motor or from a clock mechanism (not shown). The film is shown passing over rolls 23 and 27, after which it travels vertically upward between two oppositely disposed windows 14 and 18 in the casing 4, and over the guide roll 12 and further guide rolls 3 and 15, passing between two oppositely disposed windows 77 and 73 in the casing 4 between the rolls 12 and 3. It is thus caused to travel continuously past the said station over its supporting rolls. From the guide roll 15, the film is led to and over the sprocket wheel 13, and over an idler 9, after which the film is wound on a spool 17.

A spacer film 79, provided with rubber spacing tapes or ridges 55, may be unwound from a spool 21 and wound on the spool 17 along with the film 6. The ridges 55 may be about 1.5 millimeters high and may be cemented to the film 79. The successive coils of the film 6 will thus be spaced from one another and from the spacer film 79 to prevent scratching off or dislodging the dust record 57 from the film 6. If it is desired to record dustiness, or operate alarm systems, special lights, motors or the like, without preserving the record, the spacer film 79 may be omitted.

The casing 4 is shown U-shaped, the upper arm of the U holding the rolls 17 and 21 and related parts, and the lower arm the rolls 16 and 23 and related parts. The neck of the U, in which are positioned the windows 14, 18, 77 and 73, houses the vertically disposed portion of the film 6 and the rolls 27, 12 and 3, the jet 2, the chamber 8 and other parts, including a diaphragm 22 disposed between the windows 14 and 18 and a diaphragm 75 disposed between the windows 73 and 77. The pipe 1 connects with the chamber 8 between the upper and lower arms of the U, as shown more particularly in Fig. 5.

The jet 2 described in the said application is very narrow and of quite restricted area, its width being of the order, say, of one-tenth of a millimeter. According to the theory described in the said application, therefore, the dust-laden air enters the casing 4, therefore, at high velocity, causing the pressure of the gas traveling through the jet 2 to become greatly reduced, with a resulting fall in temperature. The dust-laden air may, furthermore, be led to the jet 2 through a humidifying chamber (not shown) to moisten it, and the reduced temperature causes a consequent condensation of the moisture upon the dust particles. The thus-wet dust particles impinge upon the film 6 and, if small enough, become deposited thereon. The moisture evaporates, leaving the now-dried dust particles adhering to the film. For dust particles of the size of magnesium-oxide fume, for example, the apparatus disclosed in the said prior application yields a very high efficiency.

When dust particles of different properties are employed, however, and where dust grains of different sizes are dealt with, which is usually the case, in practice, it is found that the proportion of the dust particles adhering to the film 6 does not remain quite constant. A feature of the present invention resides in overcoming this difficulty, so as to cause the adherence, with equal facility, of dust particles of different sizes, large and small, and of different chemical and physical properties.

To this end, and to render the instrument usable with all types and sizes of dust, the portion of the film 6 that is disposed between the jet 2 and the roll 12 is softened, in order to render it adhesive, thus to cause the dust particles to adhere thereto more readily. As it is this adhesive action that primarily effects the retention of the dust particles, it is no longer necessary to rely upon the theory of operation above described. It is important, instead, to have the particles sent against the film 6 with a sufficiently high speed,—say, 80 to 200 meters per second,—to cause them to become adherent to the softened portion of the film before the high-speed, incoming air suddenly changes its direction. As the jet 2 is now merely a convenient means for directing the stream of dust-laden air against the softened film 6, the widths of the jet 2 and of the light beams, hereinafter described, the spacing of the jet 2 from the film 6, and the jet velocity may all, without affecting the efficiency, be varied considerably more than with the apparatus of the said prior application. If the jet 2 is one centimeter long, with a width equal to 0.02 centimeter, and if it is spaced 0.6 millimeter from the film 6, a band 57 of dust, one centimeter wide, will become deposited, parallel to the sides of the film 6. The openings in the diaphragms 22 and 75 may be 0.45 centimeter in diameter. By having the dust band 57 wider than the diaphragm openings, unevenness due to edge effects will be avoided. As the dust particles require time to cross the opening in the diaphragm 75, there is a slight integrating effect; as the time may be as short as 1.3 minutes, however, the usefulness of the reading is not affected but, on the contrary, there results a tendency to produce a smooth curve in the event that there is a small irregularity in the mechanical drive of the film 6, as evidenced by faint striations across the dust deposit 57.

After the optical density of this softened, "dusty", portion of the film 6 has been optically compared with that of the "dustless" portion adjacent to the window 14, as hereinafter to be explained, the film is permitted to harden, with the dust deposited thereon, and it is the hardened film that is rolled up on the roll 17, as before described. The resulting dusty record 57 appears to keep almost indefinitely.

According to the preferred embodiment of the invention, the side of the film 6 adjacent to the jet 2, or to the right, as viewed in Fig. 5, is provided with a surface-coated, transparent layer of normally hard gelatin. This coating layer may be applied to the surface of the film 6, in soft condition, and allowed to harden to the film before the film is rolled on to the roll 10. When used according to the present invention, only that portion of this hardened, coating layer that is just below the jet 2, as viewed in Fig. 5, is then softened, after which the gelatin layer, with the deposited dust incorporated thereon, is allowed to reharden to the film 6. This softening is effected in any desired way, preferably by the application of a glycerin-and-water mixture to the gelatin layer, though other softeners, even water alone, will work. Organic solvents of the film 6 could also be employed.

In the specific embodiment of the invention that is herein illustrated and described, the glycerin-and-water mixture is contained in a reservoir 101, from which it flows, by gravity, into a cylindrical receptacle 103. The receptacle 103 is provided with a pin hole 105 through which the glycerin-and-water mixture slowly oozes out on to a cylindrical, cloth-wiper pad 104 that is maintained in contact with that portion of the gelatin coating that it is desired to moisten. A few cubic centimeters of the glycerin-and-water mixture are sufficient for many days' operation. The speed of travel of the film 6 is adjusted so as to obtain a dust deposit of a density such that it may be measured conveniently,—say, twenty centimeters per hour. If the softness of the gelatin film is of the right degree and not too soft,—as determined by trial,—the various sizes and kinds of dust grains will be deposited thereon in about constant proportions.

Other substances than gelatin may, of course, be employed, such as glycerin coatings, but glycerin-and-water softened gelatin has been found to be very satisfactory. One advantage of gelatin and glycerin coatings is that they are both as transparent as the film 6 itself; the glycerin is sufficiently viscous so as not to flow away; and they are both sufficiently non-volatile so as not to dry, when passing the air jet 2. The glycerin, furthermore, becomes absorbed, after a few hours, by the gelatin, so as to yield a dry, permanent record. If the proper amount of glycerin is used,—as determined by trial,— the percentage of dust that may be caused to adhere firmly to the film 6, after striking it, will be very close to 100.

It is not essential, of course, that all the dust be deposited on the film; it is sufficient that the proportion of the dust so deposited be constant and known, though the proportion should be high to prevent accumulation of dust in the casing 4 and on the windows 14, 18, 73 and 77.

A lamp 16, a mirror 69, a condenser lens system 11 and a condenser lens system 71 are positioned exterior to the casing, adjacent to the neck, and between the upper and lower arms, of the U. The lens systems 11 and 71 are designed to focus the light from the lamp 16 upon the film 6 near the respective restricted apertures or openings in the diaphragms 22 and 75.

A light beam from the lamp 16, the intensity of which may be regulated in any desired way, travels, after reflection by the mirror 69, through the condenser lens system 11 and the window 18, into the casing 4 and to the film 6. After passing through the film 6, which is "dustless" at this time,—as no dust can be deposited on the film until it reaches the jet 2,—the rays pass through the restricted aperture in the diaphragm 22 and through the window 14. The light beam subsequently passes through transparent quadrants 89 of a rotating, sectored mirror 87, as they alternate with reflecting quadrants 85, to a light-sensitive means, such as a photo-electric cell 24.

A second light beam from the lamp 16 travels, simultaneously with the first-described beam, to a "dusty" portion of the film 6, through the condenser lens system 71 and the window 73. After passing through this "dusty" portion of the film 6, the light rays of this second beam travel through the restricted aperture in the diaphragm 75, and through the window 77, to a mirror 83. After reflection by the mirror 83, these light rays are further reflected, by the alternate, mirror quadrants 85 of the rotating, sectored mirror 87, to the same photo-electric cell 24.

Rays of light originating in the same lamp 16, and traveling simultaneously through the dusted and the undusted portions of the film 6, are thus sent alternately, in rapid succession, corresponding to quarter revolutions of the disk 87, to the same photo-electric cell 24, where they are recombined.

It is desirable that the restricted apertures in the diaphragms 22 and 75 be of the same, preferably rectangular, width. It will then be possible directly to compare the relative optical densities of the said "dusty" and "dustless" portions of the film 6, adjacent to the respective apertures in the diaphragms 75 and 22. The dust concentration deposited on the film 6, near the jet 2, will thus be readily measured by the differing intensities of the said two beams of light.

An optical wedge 19, mounted upon a bar-carriage support 25, is interposed in the rays of light from the "dustless" portion of the film 6. A threaded rod 31, that is threaded in the carriage 25 at 32, is fixed to a gear 30 that meshes with a gear 29. The gear 29 is driven by, say, a 60-cycle motor 20, as will be explained hereinafter. It is thus possible to move the carriage 25 back and forth longitudinally of itself, effecting a corresponding movement of the wedge 19. It is thus possible to obscure the light from the "dustless" portion of the film 6 to a greater or less degree, depending upon the position of the wedge 19. In one position of the wedge 19, the light rays passing therethrough will have the same effect upon the photo-electric cell 24 as the light rays from the "dusty" portion of the film 6. In other positions of adjustment of the wedge 19, on the other hand, the effect upon the cell 24 will vary in accordance with such variations in position. This longitudinal adjustment of the wedge-carrying support 25 may be effected automatically by the motor 20, as will be explained hereinafter, in such fashion as to balance the slow changes in light caused by variations in dust deposit on the film 6.

The light-sensitive cell 24 is connected in the input circuit of a suitable, voltage amplifier 34, the output of which may preferably be connected to a power amplifier 36. The output circuit of the power amplifier 36 may be connected with the armature of the motor 20 by conductors 41. The field-magnet winding of the motor 20 may be supplied with alternating-current from the mains 35 at, say, 110 volts and 60 cycles. The driving motor (not shown) of the pump 26 may, if desired, be connected with these mains 35. A synchronous motor 37 for driving the sectored mirror 87 at, say, 1800 revolutions per minute, may be connected with the same mains 35 by means of wires 38.

A hand-operated wedge 33 may be adjustably inserted in the rays of light from the second exposed, or "dusty", portion of the film to provide an initial, "zero" adjustment on a chart 42 when clean air is drawn through the jet 2. The wedge 33 is adjustable in order to render the "zero" position variable, as may be desired. The chart 42 may be driven by the same synchronous motor (not shown) that drives the gear wheel 7. This may, however, be a different motor from the motor that drives the gear wheel 7.

The two beams of light from the second exposed, or "dusty" and the first exposed, or "dustless" portions of the film 6 will, after suitable adjustment of the wedge 19, produce the same, uniform, steady-current effect upon the photo-electric cell 24. The alternating-current output from the cell 24 upon the amplifier 34 will, during this condition, when dust-free air is used, be zero, and the motor 20 will be at rest. If dust should then become deposited on the film 6, so as to decrease the intensity of the rays of light traveling through the "dusty" portion 57 of the film 6, an alternating current will be produced in the photo-electric-cell circuits, which will cause suitable actuation of the motor 20, effecting corresponding actuation of the carriage support 25 and of the wedge 19 carried thereby. The motor 20 is driven in a direction which depends on the phase relation between its field and its armature and this, in turn, depends on which beam of light is stronger. The wedge 19 will thus be moved until the two beams are of the same intensity once more. There will then again be no alternating, photo-cell current to amplify, and the motor 20 will again stop. The position of a suitable marker or stylus 49, mounted upon the carriage 25, will thus be a measure of the position of the wedge 19 that restores the system to optical balance and, therefore, of the degree of dustiness of the "dusty" film portion 57. The marker or stylus 49 may leave a continuous written record on the chart 42. The movements of the marker or stylus 49 may be calibrated, from time to time, by comparison with test dust concentrations, determined by standard methods of sanitary-air analysis.

As this is a null method for measuring the intensity of a beam of light by manually adjusting a comparison beam, to indicate the point of optical balance, this system has all the advantages inherent in null methods: the photo-cell 24, the amplifier 34 and the marker or stylus 49 are zero-indicating instruments, and changes in their electrical characteristics introduce no aberrations in the readings.

The marker or stylus 49 and the record 42, controlled by the actuating device 25, may be replaced by any other desired or selected instrument, such as signal apparatus for indicating when the dust concentration exceeds a predetermined value, or any suitable mechanism for controlling the amount of dust in the air or other gas to which the jet 2 is exposed. This last may be effected, for example, by controlling the degree of ventilation, as by starting or stopping a ventilating fan. If desired, the invention may be employed to control automatically an auxiliary ventilating system supplementary to the main exhaust equipment when the dust concentration exceeds a predetermined value.

The process is without interruption, there being a continuous stream, through the jet 2, of dust-laden gas, concentrated into measurable quantities, and new dust from the gas being continuously deposited on that portion of the continuously traveling film which happens to be disposed opposite to the jet 2. Assuming that the air flow is constant, or its variability is known, the dust content of the medium is directly and continuously determined automatically and recorded by the marker or stylus 49, assuming that the speed of travel of the film past the jet 2 is likewise constant. A definite, continuous record of dustiness in factories, for example, is thus obtainable. The control of the dust content of the gas will also depend upon the above factors. By using the direct-reading record, furthermore, the engineer is enabled to determine the degree of success of the ventilating system, whether or not controlled by the apparatus of the present invention.

Modifications will obviously occur to persons skilled in the art, and all such are considered to fall within the spirit and scope of the invention as defined in the appended claims.

What is claimed is:

1. Apparatus of the character described comprising a support, a member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, and means for continuously comparing a portion of the member upon which dust has been deposited with a portion of a member upon which dust has not be deposited.

2. Apparatus of the character described comprising a support, a transparent member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, and means for comparing a portion of the member upon which dust has been deposited with a portion of the member upon which dust has not been deposited.

3. Apparatus of the character described comprising a support, a film movably mounted upon the support, the film having a layer upon which dust may be deposited when in softened condition, means for softening a portion of the layer, means for continuously directing upon the softened portion of the layer a stream of air carrying a dilute dust concentration of predetermined area in cross section at a predetermined station to cause dust from the stream of air to become deposited continuously upon the softened portion of the layer, means for preventing dust from becoming deposited upon the softened portion of the layer except at the station, means for continuously moving the film with the layer thereon upon the support past the station, and means for comparing a portion of the film upon which dust has been deposited with a portion of the film upon which dust has not been deposited.

4. Apparatus of the character described comprising a support, a member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, means for subjecting a predetermined area of a portion of the member upon which dust has been deposited to light of a predetermined intensity, means for subjecting a predetermined area of a portion of the member upon which dust has not been deposited to light of a predetermined intensity, and means for comparing the effects produced by the said lights.

5. Apparatus of the character described comprising a support, a member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, means for subjecting a portion of the member upon which dust has been deposited to a light beam, and means for comparing the light beam after it has been subjected to the said portion of the member upon which dust has been deposited with another light beam.

6. Apparatus of the character described comprising a support, a transparent member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, means for passing a light beam through a portion of the transparent member having dust deposited thereon, and means for comparing the light beam after it has passed through the said portion of the transparent member with another light beam that has not passed through the said portion of the transparent member.

7. Apparatus of the character described comprising a support, a film movably mounted upon the support, the film having a layer upon which dust may be deposited when in softened condition, means for softening a portion of the layer, means for continuously directing upon the softened portion of the layer a stream of air carrying a dilute dust concentration of predetermined area in cross section at a predetermined station to cause dust from the stream of air to become deposited continuously upon the softened portion of the layer, means for preventing dust from becoming deposited upon the softened portion of the layer except at the station, means for continuously moving the film with the layer thereon upon the support past the station, an actuable device for actuating selected instruments, and means controlled in accordance with the amount of dust deposited upon the softened portion of the layer from the stream of air for actuating the actuable device.

8. Apparatus of the character described comprising a support, a member movably mounted upon the support, the member being of a nature such that dust may be deposited thereon when in softened condition, means for softening a portion of the member, means for continuously directing upon the softened portion of the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, an actuable device for actuating selected instruments, and means controlled in accordance with the amount of dust deposited upon the member from the stream of air for actuating the actuable device.

9. Apparatus of the character described comprising a support, a transparent member movably mounted upon the support, the member being of a nature such that dust may be deposited thereon when in softened condition, means for softening a portion of the member, means for continuously directing upon the softened portion of the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, an actuable device for actuating selected instruments, and light-sensitive means controlled in accordance with the amount of dust deposited upon the member from the stream of air for actuating the actuable device.

10. Apparatus of the character described comprising a support, a member movably mounted upon the support, the member being of a nature such that dust may be deposited thereon when in softened condition, means for softening a portion of the member, means for continuously directing upon the softened portion of the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, and means for continuously measuring the amount of dust deposited upon the member.

11. Apparatus of the character described comprising a support, a member movably mounted upon the support, the member being of a nature such that dust may be deposited thereon when in softened condition, means for softening a portion of the member, means for continuously directing upon the softened portion of the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, and means for continuously making a written record of the dust deposited upon the member at the station simultaneously with the deposit of the dust upon the member.

12. Apparatus of the character described comprising a substantially air-tight casing having an opening, a film having a hardened gelatin layer movably mounted in the casing, means for softening a portion of the gelatin, means for continuously passing a gaseous medium carrying a dilute dust concentration through the opening and into the casing towards the softened gelatin on the film to cause dust from the gaseous medium to become deposited continuously upon the softened gelatin, means for continuously moving the film with the softened gelatin thereon in the casing past the opening in the path of travel of the gaseous medium, an actuable device for actuating selected instruments, and means controlled in accordance with the amount of dust deposited upon the softened gelatin from the gaseous medium for actuating the actuable device.

13. Apparatus of the character described comprising a support, a member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, an actuable device for actuating selected instruments, and means controlled in accordance with the amount of dust deposited upon the member from the stream of air for actuating the actuable device.

14. Apparatus of the character described comprising a support, a member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, an actuable device for actuating selected instruments, and light-sensitive means controlled in accordance with the amount of dust deposited upon the member from the stream of air for actuating the actuable device.

15. Apparatus of the character described comprising a support, a transparent member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, an actuable device for actuating selected instruments, and light-sensitive means controlled in accordance with the amount of dust deposited upon the member from the stream of air for actuating the actuable device.

16. Apparatus of the character described comprising a support, a member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, and means for continuously measuring the amount of dust deposited upon the member.

17. Apparatus of the character described comprising a support, a member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, and means for controlling the dust content of the stream of air in accordance with the amount of dust deposited upon the member from the stream of air.

18. Apparatus of the character described comprising a support, a member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, and means for continuously making a written record of the dust deposited upon the member at the station simultaneously with the deposit of the dust upon the member.

19. Apparatus of the character described comprising a substantially air-tight casing having a very narrow, restricted opening, a transparent film upon which dust may be deposited movably mounted in the casing, means for drawing by suction at high, substantially constant, velocity a gaseous medium carrying a dilute dust concentration through the opening and into the casing towards the transparent film to cause dust from the gaseous medium to become deposited upon the film, means for continuously moving the film with the dust deposited thereon in the casing past the opening, light-sensitive means, and means for projecting light through a predetermined area past which the film is moved and through the film with the dust deposited thereon as it is moved past the said area and on to the light-sensitive device.

20. Apparatus of the character described comprising a support, a transparent member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, an actuable device for actuating selected instruments, light-sensitive means, means for directing light through a predetermined area of the transparent member with the dust deposited thereon and on to the light-sensitive means, and means controlled by the light-sensitive means for actuating the actuable device.

21. Apparatus of the character described comprising a support, a transparent member upon which dust may be deposited movably mounted upon the support, means for continuously directing upon the member a stream of air carrying a dilute dust concentration of predetermined area in cross section at a predetermined station to cause dust from the stream of air to become deposited continuously upon the member, means for preventing dust from becoming deposited upon the member except at the station, means for continuously moving the member upon the support past the station, light-sensitive means, means for directing light of predetermined intensity through a predetermined area of the transparent member with the dust deposited thereon and on to the light-sensitive means, and means controlled by the light-sensitive means for utilizing variations in the said predetermined intensity of the light resulting from variations in the density of the dust deposited on the member.

PHILIP DRINKER.
WILLIS G. HAZARD.